Figure 1:
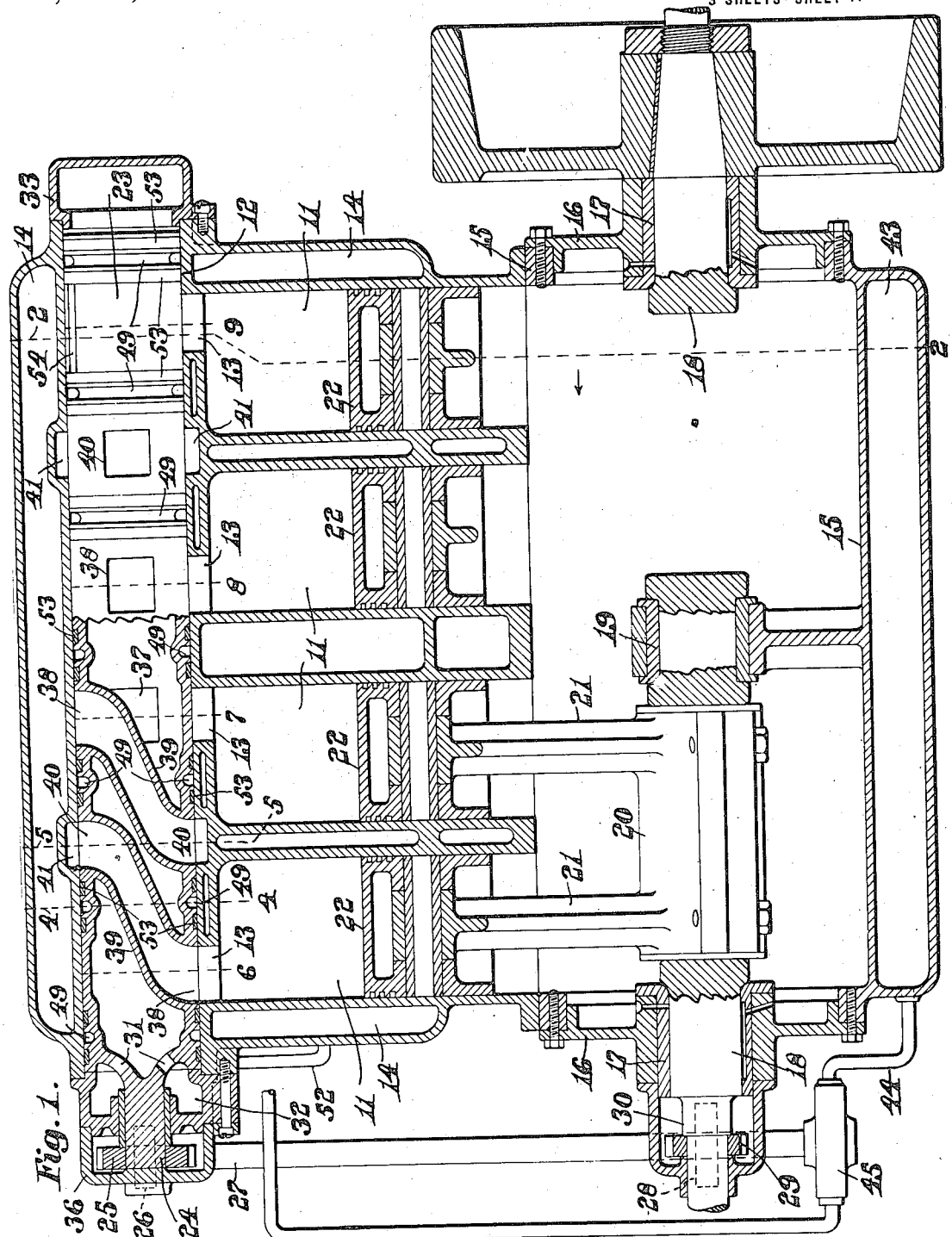

F. J. LAPOINTE.
INTERNAL COMBUSTION ENGINE.
APPLICATION FILED MAR. 19, 1915.

1,178,586.

Patented Apr. 11, 1916.
3 SHEETS—SHEET 1.

Witnesses:
N. C. Lombard

Inventor:
Francis J. Lapointe,
by Walter E. Lombard.
Atty.

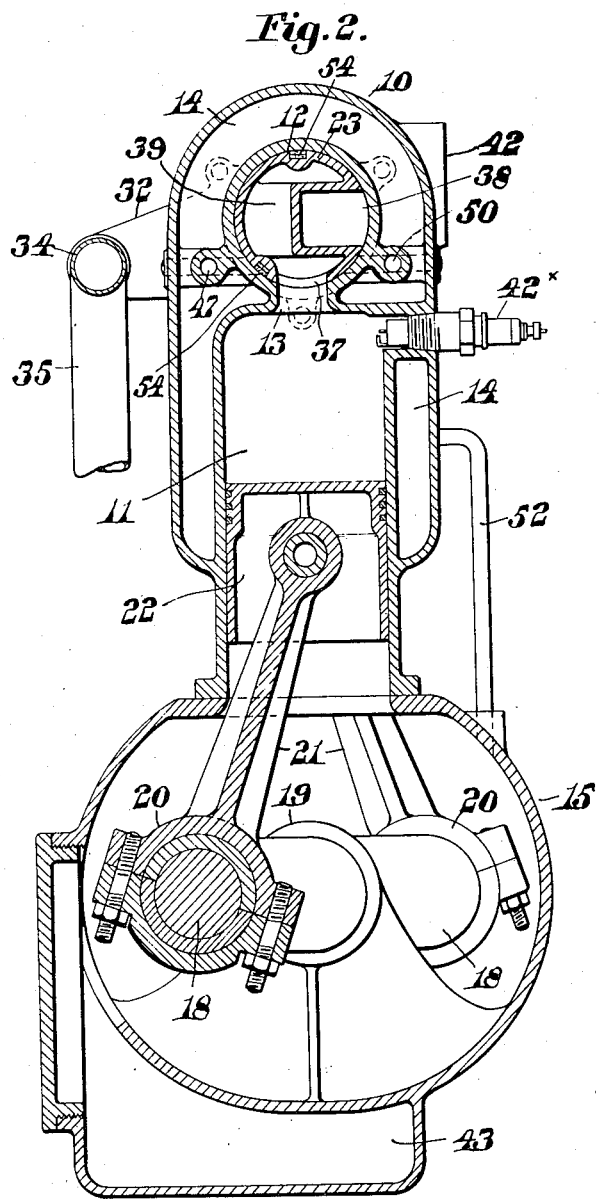

F. J. LAPOINTE.
INTERNAL COMBUSTION ENGINE.
APPLICATION FILED MAR. 19, 1915.
1,178,586.
Patented Apr. 11, 1916.
3 SHEETS—SHEET 3.
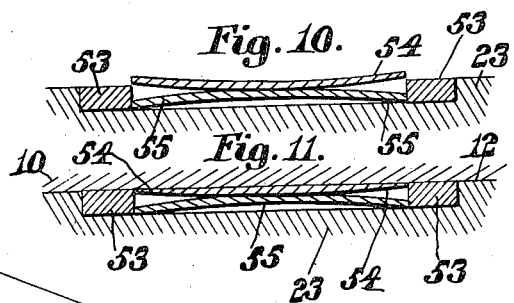
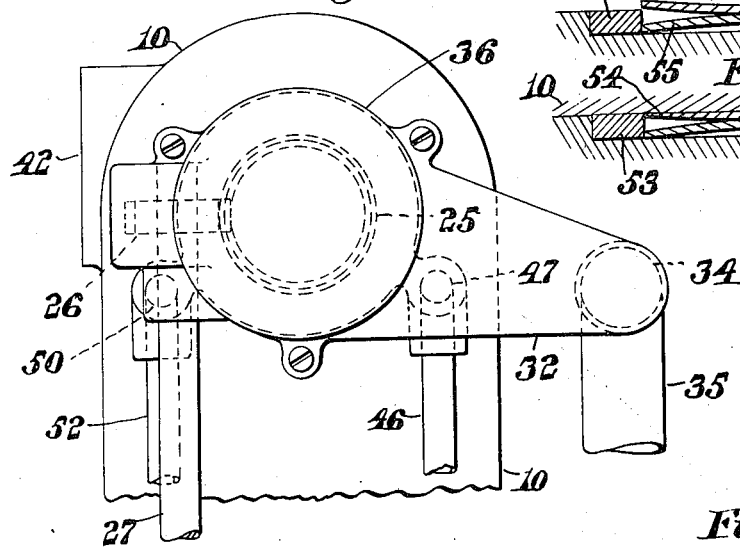
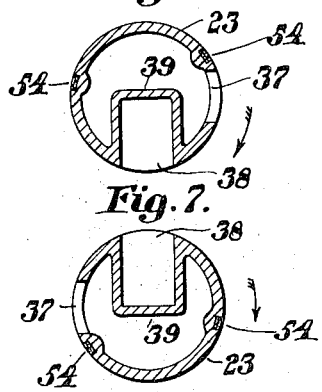
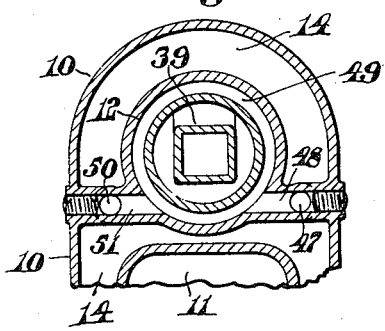
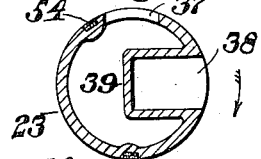
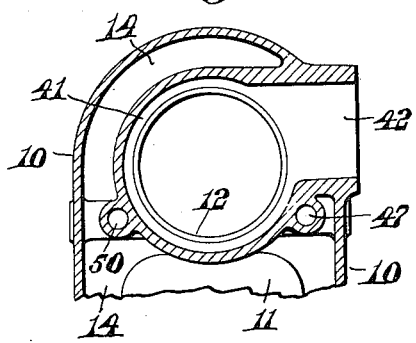
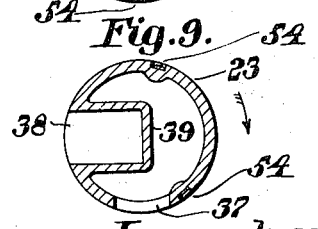
Witnesses:
N. C. Lombard
Inventor:
Francis J. Lapointe,
by Walter E. Lombard,
Atty.

UNITED STATES PATENT OFFICE.

FRANCIS J. LAPOINTE, OF NEW LONDON, CONNECTICUT.

INTERNAL-COMBUSTION ENGINE.

1,178,586.        Specification of Letters Patent.     Patented Apr. 11, 1916.

Application filed March 19, 1915. Serial No. 15,987.

*To all whom it may concern:*

Be it known that I, FRANCIS J. LAPOINTE, a citizen of the United States of America, and a resident of New London, in the county of New London and State of Connecticut, have invented certain new and useful Improvements in Internal-Combustion Engines, of which the following is a specification.

This invention relates to internal combustion engines and particularly to engines of this type in which rotary valves are used.

The principal object of the invention is the production of a valve mechanism to provide for regulating the inlet of the combustible mixture to the cylinders and the exhaust therefrom in which a hollow rotary valve is used through which the combustible mixture passes around tubular exhaust passages extending across said valve whereby the gases from the carbureter are partially heated before entering the cylinders.

The invention consists in certain novel features of construction and arrangement of parts which will be fully understood by reference to the description of the drawings and to the claims hereinafter given.

Of the drawings: Figure 1 represents a longitudinal vertical section of an engine embodying the principles of the present invention. Fig. 2 represents a transverse vertical section of the same, the cutting plane being on line 2—2 on Fig. 1, and looking in the direction of the arrow thereon. Fig. 3 represents an elevation of the upper portion of the left end of the engine. Fig. 4 represents a vertical section through the upper portion of the engine, the cutting plane being on line 4—4 on Fig. 1. Fig. 5 represents a similar section with the valve removed, the cutting plane being on line 5—5 on Fig. 1. Figs. 6 to 9 inclusive represent sections through the valve, the cutting planes being at the ports of the various cylinders, and Figs. 10 and 11 represent on an enlarged scale sectional details to be hereinafter described.

Similar characters designate like parts throughout the several figures of the drawings.

In the drawings, 10 is a casing provided with a plurality of cylinders 11 and having a valve chamber 12 extending longitudinally of said casing and above said cylinders 11 with its axis perpendicular to the axes of said cylinders. Each cylinder 11 is provided with a port 13 communicating with the valve chamber 12. The casing 10 is provided with a cooling chamber 14 adapted to contain water or some similar cooling agent. The casing 10 is secured to the crank case 15 having removable ends 16, each provided with a bearing 17 for the revoluble crank shaft 18. Intermediate the ends 16, the crank case 15 is provided with another bearing 19 for said crank shaft 18. Each crank portion of the shaft 18 has mounted thereon a sleeve 20 having two arms 21 radiating therefrom parallel with each other. The outer ends of the arms 21 are articulated to pistons 22 adapted to reciprocate in the cylinders 11. In the valve chamber 12 is mounted a rotary valve 23, one end of which is provided with a projecting stud 24 having secured thereto a spiral gear 25 meshing with a similar gear 26 secured to the upper end of a revoluble shaft 27, said shaft having mounted thereon another spiral gear 28 meshing with a similar gear 29 secured to a stud 30 extending from the end of the crank shaft 18. By means of this train of gearing the rotary valve 23 is driven from the crank shaft 18, making one complete revolution to two complete revolutions of the crank shaft. The rotary valve 23 is hollow throughout its length, being open at one end and being provided at the opposite end with openings 31 communicating with the manifold 32 secured to the end of the casing 10. At the open end of the valve 23 is another manifold 33, this manifold being connected to the other manifold 32 by a pipe 34, from which extends a pipe 35 to the outlet of the carbureter. The gears 25 and 26 are inclosed by the cap 36 secured to the manifold 32. The valve 23 is provided with a plurality of ports 37, each of which is adapted to register periodically with a port 13 in one of the cylinders 11 as the valve rotates in the direction of the arrows on Figs. 6 to 9 inclusive of the drawings. An exhaust port 38 is disposed in the valve 23 at about 90° ahead of each inlet port 37, and each exhaust port 38 is connected by an inclined tubular member 39 with a discharge port 40 communicating constantly with an annular recess 41 in the wall of the valve chamber, said recess having a discharge passage 42 therefrom, as indicated in Fig. 5 of the drawings. The recesses 41 are disposed intermediate each pair of cylinders 11 as indicated in Fig. 1 of the drawings. The tubular members 39 extend diametrically across the hollow interior of the valve 23, and the walls thereof are disconnected from said valve except at their opposite ends. Owing to this construction, the cooled gases admitted to the interior of the valve from the carbureter are partially heated by contact with the walls of the passages 39 which become more or less heated from the escaping gases being exhausted therethrough. The secaping gases are also cooled in their passage through these tubular members 39 by the constant flow of the explosive mixture through the valve.

Each cylinder 11 is provided with the usual spark plug 42$^x$, as shown in Fig. 2. In the bottom of the crank case 15 is an oil reservoir 43 from which a pipe 44 leads to a pump 45 by which the oil in the reservoir 43 may be drawn from said reservoir and forced through the pipe 46 into a passage 47 extending lengthwise of the valve chamber 12 and which communicates by means of the openings 48 with said chamber 12 opposite the peripheral grooves 49 in the valve 23. The grooves 49 also communicate by the openings 50 with a return passage 51 from the end of which a pipe 52 extends to the crank case 15. By means of this construction the oil is forced into the valve chamber and thoroughly lubricates the valve, a constant circulation being maintained, the oil being forced through the passages 47 and 50 and grooves 49, and returning into the crank case 15 through the pipe 52 to be subsequently used again.

The peripheral grooves 49 are each disposed between a port 38 and the exhaust recess 41, and on each side of each of said grooves is a peripheral packing ring 53, these rings 53 remaining stationary during the rotation of the valve 23 and effectually preventing leakage from an inlet port 37 to the exhaust recess 41. In the rear of each inlet port 37 the valve 23 is provided with a depression extending longitudinally thereof between two rings 53, and in this depression are disposed two spring packing strips 54, 55, each strip being of greater thickness in the center than at its ends. When the valve is ready to be positioned in its chamber the strips 54—55 will be in the position indicated in Fig. 10, and must be sprung inwardly to permit of the insertion of the valve 23. When first inserted the center of the strip 54 will be slightly removed from the wall of the valve chamber, but the ends will soon be worn down so that the outer face of said member 54 will be flattened and the member 55 will be moved farther outward to retain the strip 54 in close contact with the chamber wall, thereby preventing the escape of gases around the periphery of the valve 23. Similar packing strips are provided in the periphery of said valve at a point substantially midway between the inlet and exhaust ports therein. It is obvious that by means of the constant circulation of the oil through the valve chamber 12, the valve 23 will be thoroughly lubricated.

By means of the construction of valve herein shown and described, the overheating of the valve is effectually prevented.

It is believed that the operation and many advantages of this invention will be fully understood from the foregoing description.

Having thus described my invention, I claim:

1. In a device of the class described, the combination of a plurality of cylinders, each having a port in the upper end; a hollow rotary valve above said cylinders open at one end and provided with inlet ports adapted in the rotation of said valve to register periodically with said cylinder ports and having inclosed exhaust passages extending across the interior of said valve; a valve casing having annular recesses therein at one side of said cylinder ports and with which the outlet ends of said inclosed passages are in constant communication; and a reciprocating piston in each cylinder.

2. In a device of the class described, the combination of two cylinders each having a port in the upper end; a hollow rotary valve above said cylinders open at one end and provided with two inlet ports adapted in the rotation of said valve to register periodically with said cylinder ports; a valve casing provided with an annular recess intermediate said cylinders; and inclosed passages extending across said hollow valve, each having one end constantly communicating with said recess while the other ends are adapted to register intermittently with said cylinder ports; and a reciprocating piston in each cylinder.

3. In a device of the class described, the combination of two cylinders each having an inlet port in the end thereof; a hollow rotary valve having an inlet thereto at one end and provided with inlet ports registering periodically with the cylinder ports during the rotation of said valve; inclined inclosed passages extending across said valve, one end of each of said passages intermittently communicating with a cylinder port, with the other end thereof in constant communication with the exhaust outlet; and a reciprocating piston in each cylinder.

4. In a device of the class described, the combination of two cylinders each having a port in the end thereof; a hollow rotary valve having an inlet thereto at one end and provided with inlet ports registering periodically with said cylinder ports during the rotation of said valve; exhaust ports in said valve in the same plane with said inlet ports; an annular exhaust recess in the valve casing; and tubular members extending across said valve from said exhaust ports to said recess.

5. In a device of the class described, the combination of two cylinders each having a port in the end thereof; a hollow rotary valve having an inlet thereto at one end and provided with inlet and exhaust ports alternately registering with said cylinder ports in the rotation of said valve; a valve casing having an annular recess intermediate said cylinder ports; a tubular member extending across said valve from each exhaust port and constantly communicating with said annular recess, said tubular member being disconnected from said valve except at its opposite ends; and a reciprocating piston in each cylinder.

6. In a device of the class described, the combination of a casing having a cylindrical valve chamber with an annular recess therein and two cylinders perpendicular to said valve chamber one on each side of said recess each communicating with said valve chamber by a port; a rotary valve in said valve chamber having two ports adapted in its rotation to alternately register with each of said cylinder ports, one of said ports constantly communicating with said recess by means of a tubular member extending across said valve; a reciprocating piston in each cylinder; and means for admitting a combustible mixture into each end of said valve chamber.

Signed by me at New London, Connecticut this 17th day of March 1915.

FRANCIS J. LAPOINTE.